Figure 1:
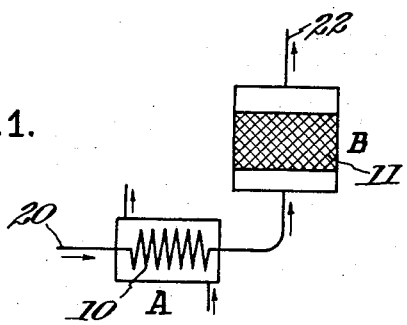

July 28, 1925.  1,547,924
F. P. KERSCHBAUM
PROCESS OF DECOMPOSING GAS MIXTURES BY
MEANS OF ADSORPTIVE SOLID SUBSTANCES
Filed June 9, 1924

Inventor:
Friedrich P. Kerschbaum
by Byrnes Townsend & Brickenstein
his Attorneys.

Patented July 28, 1925.

1,547,924

UNITED STATES PATENT OFFICE.

FRIEDRICH PAUL KERSCHBAUM, OF FRANKFORT-ON-THE-MAIN, GERMANY, ASSIGNOR TO AMERICAN LURGI CORPORATION, OF NEW YORK, N. Y., A CORPORATION OF NEW YORK.

PROCESS OF DECOMPOSING GAS MIXTURES BY MEANS OF ADSORPTIVE SOLID SUBSTANCES.

Application filed June 9, 1924. Serial No. 718,976.

*To all whom it may concern:*

Be it known that I, FRIEDRICH PAUL KERSCHBAUM, citizen of the Austrian Republic, residing at Frankfort-on-the-Main, Konigstrasse 72, Germany, have invented certain new and useful Improvements in Processes of Decomposing Gas Mixtures by Means of Adsorptive Solid Substances, of which the following is a specification.

This invention relates to a process of decomposing gas mixtures by means of adsorptive solid substances.

A number of technical gas mixtures have become known, from which certain economically valuable gas- or vapour-constituents are obtainable by means of adsorptively active solid substances in an essentially simple manner, by merely passing the gas mixtures over or through the granular solid adsorptive agent. In practice however it may frequently happen that the separation of the components of the gas mixture by means of the adsorptive substances cannot be effected so simply, because when passing the gas current over or through the granular adsorptive agent, not only adsorptive charging of the latter, but also secondary processes take place which lead to the separation upon the adsorptive agent of solid or liquid products which coat the surface of the adsorptive agent and consequently destroy the action of the latter in the course of time.

Thus for example the distillation gases produced in the distillation of fuels contain more or less large amounts of gaseous light oils according to the fuel employed and the nature of the distillation process, which are obtainable in a most simple manner in principle, by adsorption upon active carbon. However, in practice such recovery of the light oil vapour contents of distillation gases by means of active carbon cannot be effected long, because the distillation gas, besides containing in the form of mist substances such as tar, contains also other gaseous substances such as for example, sulphuretted hydrogen, volatile organic oxidizable substances, besides oxygen, and also polymerizable gaseous compounds which simultaneously with the adsorptive charging of the active carbon with vaporized light oil constituents, undergo a chemical transformation upon the surface of the active carbon, leading to the formation of solid or liquid products which coat the surface of the active carbon and may render the carbon ineffective. Thus, for example, the sulphuretted hydrogen-oxygen-contents of the distillation gases, in consequence of a transformation into elementary sulphur and water, entails a separation of solid sulphur and sometimes also of liquid water upon the surface of the carbon, the effective surface of which is thereby decreased. A content in certain polymerizable gases or vapours leads to a resinification on the surface of the carbon, which also has a detrimental action upon the adsorptive efficiency of the carbon.

Experiments have now revealed the unexpected fact that it is possible to carry out the adsorptive separation of gas mixtures of the kind above specified, i. e., for example the separation of light oil vapours from gas mixtures containing sulphuretted hydrogen and oxygen, by means of a predetermined amount of active carbon permanently and unhindered by detrimental secondary reactions, if one of the arrangements of the kind hereinafter set forth or a combination thereof is selected.

1. If the gas mixture, that is for example the distillation gas containing light oil and sulphuretted hydrogen and oxygen is sufficiently cooled prior to its entry into the mass of active carbon which is arranged as a granular filtering layer, it has been found that the active carbon retains the light oil content of the gas mixture quantitatively, whilst allowing the other constituents of the gas, primarily the sulphuretted hydrogen and oxygen to pass therethrough entirely unaltered.

Thus the desired separation effect is attained by preliminary cooling the gases to a sufficient extent.

Apparently the reason for the occurrence of this separating effect can be sought in the fact that owing to the preliminary cooling of the gas mixture, the temperature of the mass of solid adsorbent material which, without preliminary gas cooling, rises considerably when taking up the light oil vapours under the action of the very considerable positive heat of adsorption, can in this case no longer rise sufficiently high for a reactive transformation for example of the sulphuretted hydrogen with the oxygen to take place at the surface of the carbon, to any appreciable extent. On the contrary, the adsorptive efficiency is even favoured by the cooling.

2. The gas mixture to be separated, i. e., for example the aforesaid distillation gas is admitted to the solid adsorptive agent which is arranged as an ordinary filtering layer without any preliminary cooling, that is, at ordinary working temperature. According to the invention however the admission of the gas mixture to the active carbon is not effected directly, but as an addition to a gas circuit formed by a suitable gas circulating device in conjunction with the adsorptive filter, and filled originally with any desired gas mixture. If the gas mixture to be separated is supplied to the circuit before the filter (in the direction of flow) and the excess is led away behind the filter, the gas mixture to be treated is caused to pass through the active filter at a considerably increased speed. It will then be found that a sharp separation of the adsorbable gas constitutents occurs without any reactive transformation taking place on the surface of the solid adsorptive agent. The increase in speed apparently causes the zone of adsorptive charging which experience has shown to be very small at the usual slow gas speeds in consequence of the low speed of the gas, and the high speed of adsorption, to be extended considerably in the direction of the flow of the gases, so that the heat of adsorption instead of being concentrated in a thin layer, can be distributed throughout any desired adjustable volume of carbon thereby preventing the occurrence of high temperatures in the zone of adsorptive charging, and thus the occurrence of detrimental secondary reactions which requires a higher temperature than the ordinary working temperature at the surface of the adsorptive substance.

If a number of such gas circuits are connected together in series in which case incidentally, their circuits produced by driving devices may preferably be coupled mechanically together, an arrangement is obtained which, as regards the height of the attainable adsorptive charge of the adsorptive medium does not differ from an arrangement without any gas circuit; the above mentioned adsorptive zone is merely increased in area in accordance with the speed of the gas; the required amount of solid adsorbents is larger and obviously also the total adsorptive capacity of the predetermined amount of adsorbent is correspondingly greater.

A preferable arrangement of filter layers of granular adsorptive material for a system of gas circuits arranged in serial order is obtained by producing in a vertical shaft by means of corresponding gas inlets and outlets, filtering layers arranged in series in direction of flow which on movement of the granular adsorption material in the shaft may travel in counter-current to the gas circulation.

Apparently thus in this second specified manner also, it is possible to effect at suitable working temperatures without any preliminary cooling the complete adsorptive charging of the adsorptive agents corresponding to this temperature whilst avoiding the occurrence of the above mentioned detrimental secondary reactions, which must damage the surface of the adsorptive medium at any rate after prolonged use.

Thus according to the present invention the two above-described processes exploit practically the temperature co-efficients of opposite sign of the adsorptive charge and of the reactive transformation in a particularly effective manner.

It has proved especially advantageous to select as adsorptive agents for processes of the above kind an active substance of good heat conductivity, for instance to select a certain kind of active carbon, because the conduction of heat by adsorption agent itself will enable the desired result to be obtained in a still better manner.

In conjunction with this measure it is moreover advantageous to use the heat of electric current for regenerating such heat-conductive—i. e., also electrically conductive—adsorption masses for the purpose of separating and obtaining of the adsorbed products.

Apparatus for carrying out the method is shown in the accompanying drawings in which—

Figure 2:
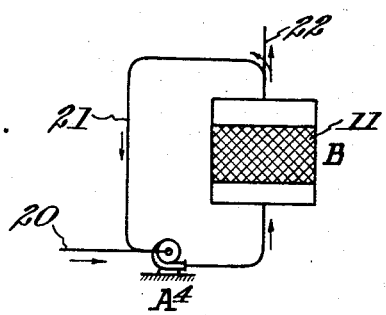
Figure 3:
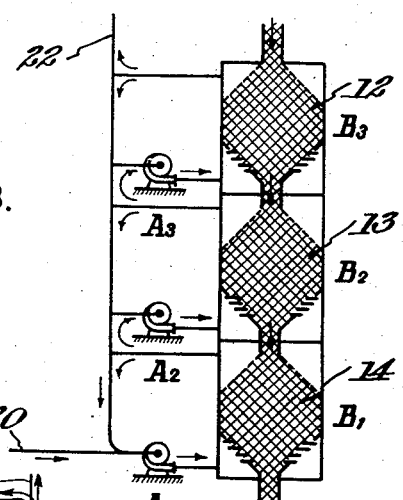
Figure 4:
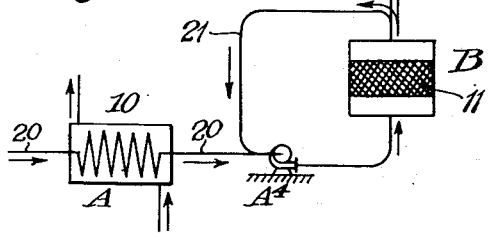

Fig. 1 schematically illustrates an apparatus comprising a cooler for the gas mixture;

Fig. 2 schematically illustrates an apparatus comprising a gas circulating device;

Fig. 3 schematically illustrates an apparatus in which the granular material moves counter-current to the gas current; and Fig. 4 schematically illustrates an apparatus comprising both a cooler and a gas circulating device.

Referring to Fig. 1, A is the cooler and B the adsorber. The gas mixture enters through pipe 20, passes through the coil 10 in the cooler and then through the granular adsorptive material 11 in the adsorber.

In Fig. 2 the blower A⁴ forces the gas mixture to be treated entering through pipe 20 together with the diluting non-absorbable gas from pipe 21, through the adsorptive material 11. The diluting gases may be obtained by connecting pipe 21 to the exit pipe 22 of the adsorber as illustrated, so that a complete cycle is formed.

Fig. 3 shows a number of cycles connected in series. In this arrangement the granular adsorptive material passes downwardly through a vertical shaft divided by partitions into several zones $B_1$, $B_2$, $B_3$, each zone having its own pump $A_1$, $A_2$, $A_3$, for cyclically circulating the gases therethrough. The several pumps may be mechanically coupled if desired. As shown, the granular adsorptive material moves downwardly counter-current to the upward flow of the mixed gases in each zone.

By this system the abstraction of heat to control the operating temperature at a suitable degree can be readily effected.

The apparatus illustrated in Fig. 4 includes an adsorber B, the gas circulating device comprising pipe 21 and pump $A^4$ and a cooler A in the gas supply pipe 20.

What I claim is:

1. In processes of decomposing by means of solid adsorptive materials gas mixtures containing a component to be adsorbed and a component which tends to produce a coating upon the surface of adsorptive material and render the same inactive, the step which consists in contacting such a gas mixture with a solid adsorptive material while maintaining the temperature within the adsorptive zone so low that the deposition of a coating upon the adsorptive material does not take place.

2. In processes of decomposing by means of solid adsorptive materials gas mixtures containing in addition to an adsorbable component also a component which in the presence of the adsorptive material and under conditions suitable for the adsorption of the adsorbable material is capable of chemical transformation resulting in the deposition of a coating upon the surface of the adsorptive material, the step which consists in passing such a gas mixture in contact with a solid adsorptive material while maintaining the temperature of the gas and the adsorptive material in the adsorption zone so low that chemical transformation and the deposition of a coating upon the adsorptive material does not take place.

3. Process as defined in claim 1 in which the gas mixture is diluted with a gas which is not adsorbed by the adsorptive material before being contacted with the adsorptive material.

4. Process as defined in claim 1 in which the gas mixture is cooled and diluted with a gas which is not adsorbed by the adsorptive material before being contacted with the adsorptive material.

5. Process as defined in claim 1 in which a part at least of the gas mixture after being contacted with adsorptive material is mixed with fresh gas mixture before it is contacted with the adsorptive material.

6. Process as defined in claim 1 in which the gax mixture is contacted with the adsorptive material in a plurality of succeeding cycles, a portion of the gas after contact with the adsorptive material in each cycle being mixed with gas mixture entering that cycle, and the remainder of said gas after contact with the adsorptive material in each cycle passing to the next succeeding cycle.

7. Process as defined in claim 1 in which the adsorptive material used is a good conductor of heat and electricity.

In testimony whereof I affix my signature in presence of two witnesses.

FRIEDRICH PAUL KERSCHBAUM.

Witnesses:
ROBERT ENGLER,
JANE GUISTI.